United States Patent
Lee et al.

(10) Patent No.: US 7,234,052 B2
(45) Date of Patent: Jun. 19, 2007

(54) SYSTEM BOOT USING NAND FLASH MEMORY AND METHOD THEREOF

(75) Inventors: Seok-Heon Lee, Suwon-si (KR); Young-Joon Choi, Seongnam-si (KR); Seok-Cheon Kwon, Seongnam-si (KR); Jae Young Lee, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 582 days.

(21) Appl. No.: 10/282,400

(22) Filed: Oct. 29, 2002

(65) Prior Publication Data

US 2003/0172261 A1 Sep. 11, 2003

(30) Foreign Application Priority Data

Mar. 8, 2002 (KR) .................. 10-2002-0012356
Mar. 23, 2002 (KR) .................. 10-2002-0015856

(51) Int. Cl.
*G06F 9/24* (2006.01)

(52) U.S. Cl. .................. 713/2; 713/1; 711/101

(58) Field of Classification Search .................. None
See application file for complete search history.

(56) References Cited

U.S. PATENT DOCUMENTS

| 5,413,775 A | 5/1995 | Hatfield et al. |
|---|---|---|
| 5,432,927 A | 7/1995 | Grote et al. |
| 5,471,674 A | 11/1995 | Stewart et al. |
| 5,479,639 A | 12/1995 | Ewertz et al. |
| 5,519,843 A | 5/1996 | Moran et al. |
| 5,535,357 A | 7/1996 | Moran et al. |
| 5,768,584 A | 6/1998 | MacDonald et al. |
| 5,794,054 A | 8/1998 | Le et al. |
| 5,835,761 A | 11/1998 | Ishii et al. |
| 5,918,047 A | 6/1999 | Leavitt et al. |
| 5,951,685 A | 9/1999 | Stancil |
| 6,058,474 A * | 5/2000 | Baltz et al. .................. 713/1 |
| 6,079,016 A | 6/2000 | Park |
| 6,182,004 B1 | 1/2001 | Komori |
| 6,182,187 B1 | 1/2001 | Cox et al. |
| 6,205,513 B1 | 3/2001 | Godicke et al. |

(Continued)

FOREIGN PATENT DOCUMENTS

EP      1286263 A      2/2003

(Continued)

OTHER PUBLICATIONS

XILINX: "Xilinx Generic Flash Memory Interface Solutions. WP143 (v1.0)." Xilix-White Paper: Spartan II, May 8, 2001, pp. 1-12, XP-002354896' www.xilinx.com.

(Continued)

*Primary Examiner*—Thuan Du
(74) *Attorney, Agent, or Firm*—F. Chau & Assoc., LLC

(57) ABSTRACT

A system and method are provided for booting a computing device using a NAND flash memory. Boot code stored in the NAND flash memory is transferred to a RAM for execution by the CPU. Operating system program stored in the NAND flash memory is transferred to a system memory for execution therefrom by the CPU after system boot.

23 Claims, 9 Drawing Sheets

U.S. PATENT DOCUMENTS

| | | | |
|---|---|---|---|
| 6,212,632 B1 | 4/2001 | Surine et al. | |
| 6,282,643 B1 | 8/2001 | Cromer et al. | |
| 6,504,765 B1 * | 1/2003 | Joo | 365/185.29 |
| 6,601,167 B1 * | 7/2003 | Gibson et al. | 713/2 |
| 2001/0015905 A1 | 8/2001 | Kim et al. | |
| 2003/0233533 A1 * | 12/2003 | Avraham | 713/1 |

FOREIGN PATENT DOCUMENTS

| | | |
|---|---|---|
| WO | 01/52062 A | 7/2001 |
| WO | WO 01/52062 A2 | 7/2001 |

OTHER PUBLICATIONS

Sharon Dagan "Designing the DiskOnChip as a Flash Disk and Boot Device Replacement" Internet Citation, [Online] 2001 XP002294422 Retrieved from the Internet: URL:http://www.m-sys.com/files/documentation/doc/App_Note_047_Des_DOC_FD_Boot_Rev1.0.pdf> [retrieved on Aug. 30, 2004] paragraphs [0001] - [2.1.1].

Xilinx "Xilinx Generic Flash Memory Interface Solutions. WP143 (v1.0)." Xilinx-White Paper: Spartan II, [Online] May 8, 2001, pp. 1-12, XP002354896 Retrieved from the Internet: URL:http://direct.xilinx.com/bvdocs/whitepapers/wp143.pdf> [retrieved on Nov. 15, 2005] *the whole document*.

* cited by examiner

FIG. 1 Background
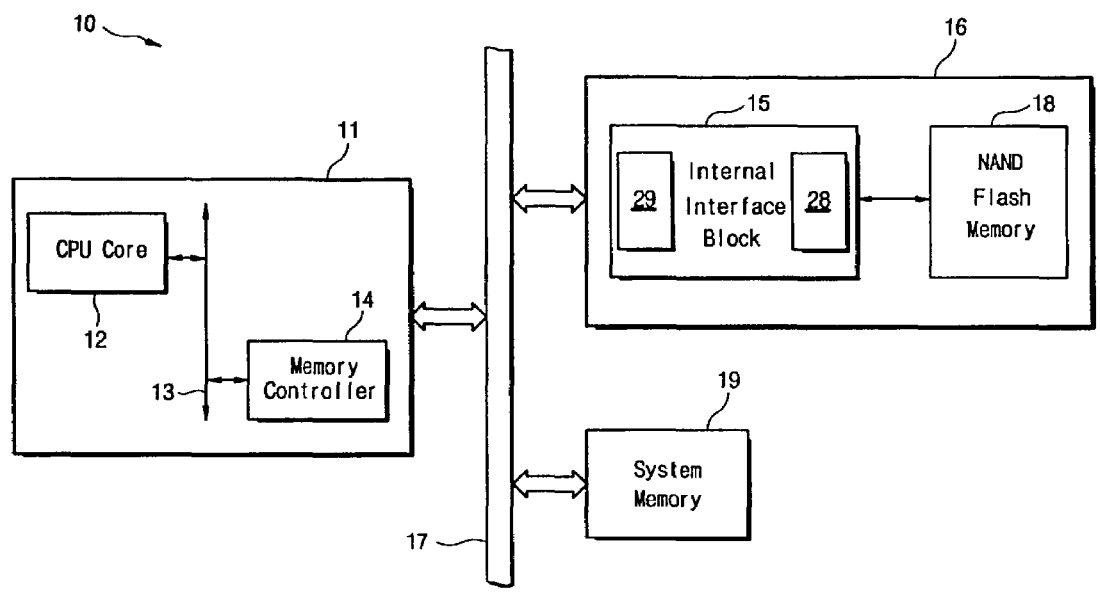
FIG. 2
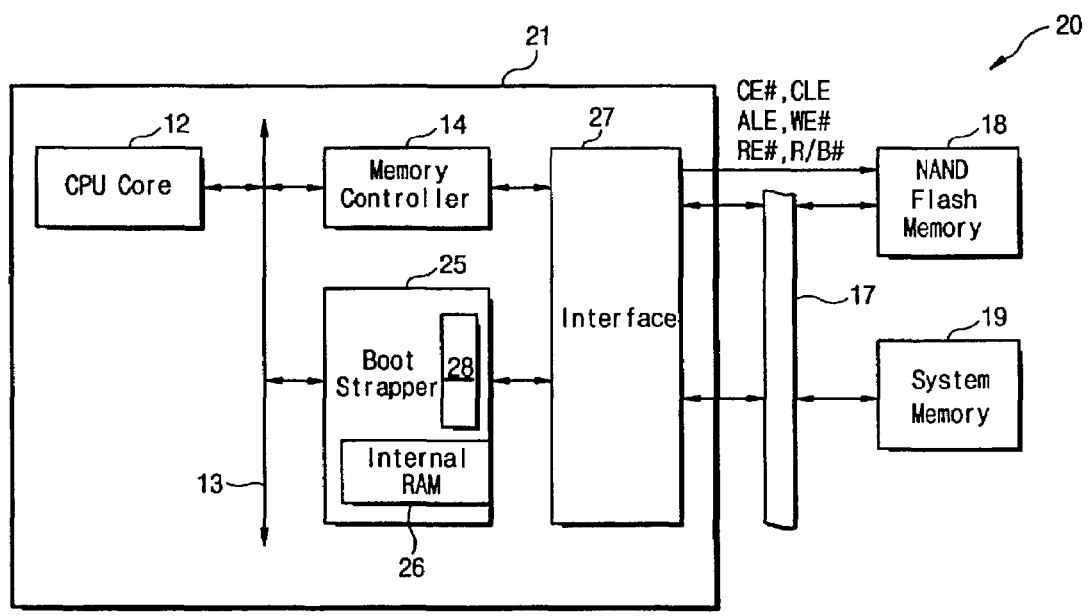

SYSTEM BOOT USING NAND FLASH MEMORY AND METHOD THEREOF

BACKGROUND OF THE INVENTION

1. Technical Field

The present invention relates to a system for booting a computing device; more particularly, a system booted using a NAND flash memory and a booting method thereof.

2. Discussion of Related Art

In every typical personal computer (PC) or computing device such as a personal digital assistant (PDA), a program installed in a basic input/output service (BIOS) is executed when the PC or device is turned on. A number of initialization functions are performed by executing the BIOS program. These functions are typically: checking the CMOS Setup for custom settings; loading the interrupt handlers and device drivers; initializing registers and power management; performing the power-on self-test (POST) for installed components or peripherals such as disk drives; displaying system settings; determining which components are bootable; and initiating the bootstrap sequence. Conventionally, a BIOS (or booting) program is stored in a read only memory (ROM), an erasable programmable read only memory (EPROM) or a NOR-type logic (NOR) flash memory.

If a booting program is stored in a ROM, since ROMs are nonvolatile, the stored program cannot be changed. Any minor changes necessary to the stored program require replacement of the ROM. In the case where a booting program is stored in an EPROM, the previously stored program must be erased if there are changes to the stored program. EPROM erasure further requires a separate component or device. As such, any changes or updates needed in the booting program cannot be easily performed if the program is stored in a ROM or an EPROM. In the case where a booting program is stored in a NOR-logic (NOR) flash memory, the stored program can be erased or updated. However, compared to a NAND-logic (NAND) flash memory, the NOR flash memory are larger in size for a given memory storage capacity and is more expensive to manufacture.

One example of a system with a NAND flash memory storing a BIOS is illustrated in FIG.1, which is disclosed in U.S. Pat. No. 5,535,357. Referring to FIG. 1, a system 10 includes a system bus 17, a combination chip 16 in which a NAND flash memory 18 and an internal interface block 15 are incorporated, and a controller 11 for controlling the combination chip 16 and the system memory 19. The controller 11 can be a central processing unit (CPU), which has a CPU core 12 for performing computing functions, a memory controller 14, and an internal system bus 13 which is internal within the controller 11. The memory controller 14 carries out a memory map between the NAND flash memory 18 and the system memory 19, and uses the internal interface block 15 for interfacing functions performed according to the memory map. The internal interface block 15 temporarily stores data of the NAND flash memory device in a storage device such as a register or RAM, and transfers the temporarily stored data to the system memory through the system bus 17 under control of the memory controller 14.

The internal interface block 15 includes a NAND interface logic 28 for interfacing with the NAND flash memory 18 and a NOR interface logic 29 for interfacing with the system memory 19 or memory controller 14 through system bus 17. The NOR interface logic 29 is circuit conventionally used for interfacing between a NOR flash memory and memory controller and/or system memory. If the flash memory was a NOR flash memory, the NAND interface logic 28 would not be needed to conform signals from the flash memory to 'NOR interface manner' (one skilled in the art may refer to this term as "ROM interface manner"), which is data transfer where random access of the memory is possible based on an address of a byte/word unit. In contrast, data transfer by 'NAND interface manner' is not by random access, but data of block units is transferred by a block address and a command.

The system 10 transfers data of the NAND flash memory 18 to the internal interface block 15 through the NAND interface logic 28 using the NAND interface manner, and transfers the data to the system memory 19 through the NOR interface logic 29 using the NOR interface manner. Since data access from the NAND flash memory 18 requires traversing the two-stage NAND interface manner and NOR interface manner, data access speed is compromised. Further, system performance rating of such device cannot be optimal because the time required for accessing a booting code stored in the flash memory device by the memory controller is one measure of system performance.

Moreover, since all data of the NAND flash memory 18 need to be loaded into the internal interface block 15 and logic circuit supporting both NAND and NOR interfaces is needed, the internal interface block 15 need to be physically large in size. Accordingly, system 10 as shown in FIG. 1 may suffer from high cost and sub-optimal performance rating.

SUMMARY OF THE INVENTION

A system having a CPU core, a system memory, and an interface for communicating data therebetween is provided, the system comprising: a NAND flash memory for storing at least a boot code; a boot strapper for coordinating transfer of control signal to the NAND flash memory and receiving the boot code from the NAND flash memory through the interface; and a RAM for storing the boot code accessed from the NAND flash memory, wherein booting of the system includes reading of the boot code from the RAM by the CPU core. Preferably, the boot code includes a system initialization program and a copy instruction program.

According to an embodiment of the invention, the boot strapper includes a NAND interface logic for interfacing the NAND flash memory, and the RAM for storing the boot code is integrated into the boot strapper.

In an alternative embodiment, the RAM is external to the boot strapper.

The system further includes a delay for delaying initialization operations of the CPU core until the boot code is stored in the RAM. The delay is implemented by the boot strapper and the interface is implemented by a memory controller. The memory controller includes a NAND interface logic for interfacing the NAND flash memory in an NAND interface manner.

According to another embodiment of the invention, the RAM is a cache memory connected to the CPU core through a first local bus. The system further includes a wrapper for connecting the boot strapper to the cache memory. A second local bus connects the boot strapper directly to the cache memory.

The system further includes in one embodiment a memory controller for controlling the NAND flash memory and the system memory through the interface and a system bus, wherein the interface includes means for preventing access of the system bus by the memory controller and the boot strapper at the same time.

According to another embodiment to the invention, a system having a CPU core, a system memory, and an interface for communicating data therebetween is provided, the system comprising:

a NAND flash memory for storing an operating system program; and a ROM for storing boot code, wherein booting of the system includes reading of the boot code from the ROM by the CPU core. Preferably, the operating system program is copied to the system memory upon initialization, and the CPU executes the operating system program by accessing the system memory.

According to still another embodiment of the invention, a system having a CPU core, a system memory, and an interface for communicating data therebetween is provided, the system comprising: a NAND flash memory for storing a boot code; a boot strapper connected to the NAND flash memory through a system bus for receiving the boot code from the NAND flash memory, the boot strapper including a RAM for storing the boot code, wherein booting of the system includes reading of the boot code from the RAM by the CPU core.

In another aspect of the invention, a system having a CPU core, a system memory, and an interface for communicating data therebetween is provided, the system comprising: NAND flash memory for storing an operating system program; a plurality of coupling pins for setting parameters of initialization; and a copy logic circuit for causing the copying of the operating system program into the system memory upon receipt of a system initialization signal, wherein the CPU core executes the operating system program by accessing the system memory.

In still another aspect of the invention, a system having a CPU core, a system memory, and an interface for communicating data therebetween is provided, the system comprising a flash memory for storing at least a boot code; a boot strapper for coordinating transfer of control signal to the flash memory and receiving the boot code from the flash memory through the interface; first and second memory controllers for selectively controlling the flash memory; and a selector for selecting operation of one of the first and second memory controllers depending on the type of flash memory.

The flash memory is one of a NOR and a NAND flash memory. The first memory controller includes a NOR interface logic and the second memory controller includes a NAND interface logic.

The system preferably further includes a RAM for storing the boot code received from the flash memory, and the selector includes a select pin for selecting operation of one of the first and second memory controllers.

According to a method of booting according to the present invention, in a computing device having a CPU core, system memory and memory controller, the method comprising the steps of: prestoring boot code in a NAND flash memory; receiving a system initializing signal, transferring the boot code from the NAND flash memory into a RAM, and executing by the CPU core the boot code stored in the RAM.

The method further includes the step of: upon receiving the system initializing signal, holding the CPU core from execution until the completion of the step of transferring the boot code from the NAND flash memory into the RAM.

BRIEF DESCRIPTION OF THE DRAWINGS

FIG. 1 shows a computing system having a conventional NAND flesh memory.

FIG. 2 shows an embodiment of the present invention using a boot code storing NAND flash memory.

DESCRIPTION OF PREFERRED EMBODIMENTS

Figure 3:
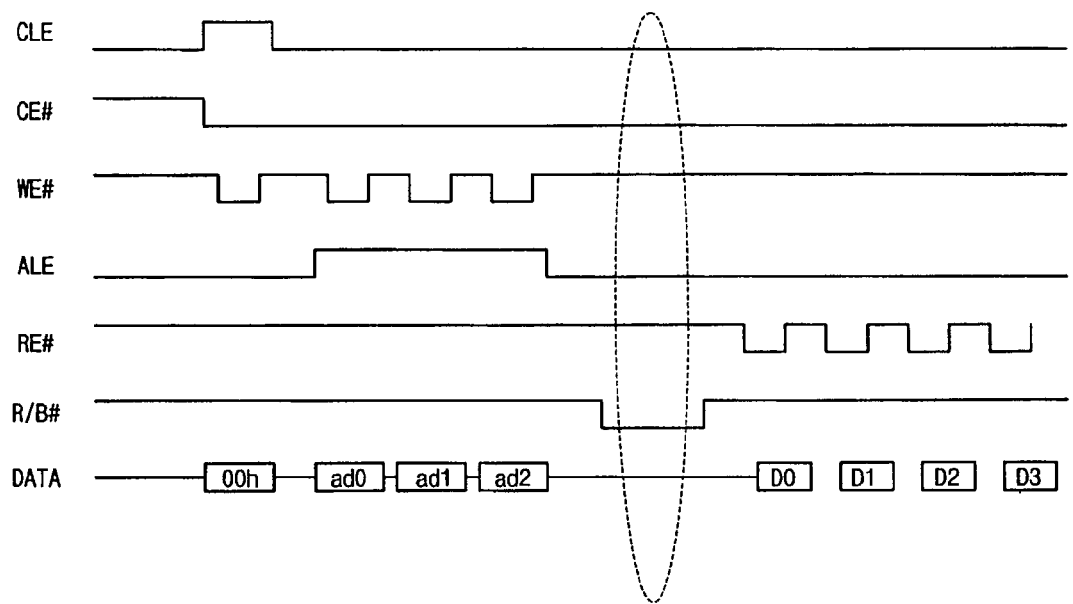
FIG. 3 shows a timing diagram of a process of transferring boot code from the flash memory.

A system using a NAND flash memory according to an embodiment of the present invention is illustrated in FIG. 2.

Referring to FIG. 2, a computing system 20 includes a controller 21, a system bus 17, a NAND flash memory 18, and a system memory 19. The computing system 20 comprises essential components of a computing device which can be a personal digital assistant (PDA), palm computer, laptop, a personal computer, or any system booted by a system-initializing program (commonly referred to as a boot code).

The controller 21 has a CPU core 12, an internal system bus 13, a memory controller 14, a boot strapper 25, and an interface 27. The controller 21 may be embodied in a single semiconductor chip, and generally controls and manages any memory, such as NAND flash memory 18 and system memory 19 connected to the system bus 17.

The system bus 17 is used for data transfer of the controller 21, the NAND flash memory 18, and the system memory 19.

The NAND flash memory 18 stores a boot code for booting the system 20, and may further store an operating system (OS) and other program or data. The OS can be Microsoft DOS or WINDOWS, which is executed by controller 21 for operating the system 20 after the booting or initializing process. The data stored in the NAND flash memory 18 can also be a configuration code of user storage devices based on user's demands and software code for indicating how to utilize application programs.

The system memory 19 is preferably a dynamic random access memory (DRAM), which serves as a main memory for storing data, instruction and the like.

The CPU core 12 executes the OS, application and operation programs. The internal system bus 13 transfers data to and from the CPU core 12 and between the memory controller 14 and the boot strapper 25.

According to this embodiment of the present invention, the boot code is first stored in the NAND flash memory 18 prior to initializing. Upon initializing, the boot code stored in the NAND flash memory 18 is transferred to an internal RAM 26 in boot strapper 25. A NAND interface logic 28 interfaces with NAND flash memory 18 and transfers the boot code stored in the NAND flash memory 18 to the internal RAM 26. After transfer of the boot code is completed, the boot code including system-initializing code and copy loop instruction code is executed by the CPU core 12. The system initializing code, when executed, initializes the controller 21, the NAND flash memory 21, the system memory 19, and peripheral devices. The copy loop instruction code instructs a copy of the operating system or other data stored to be loaded into the system memory 19. The size of the operating system or other data loaded from the NAND flash memory to the internal RAM 26 at any one time may be determined by a value designated by the boot code, or it can be determined by hardware logic in the boot strapper 25. Since the boot strapper 25 need only include one NAND interface logic as opposed to both NOR and NAND interface logic (see FIG. 1), the boot strapper 25 is small in size as compared to the interface block 15 of FIG. 1. Further, since the internal RAM 26 need only store the boot code, it has a smaller capacitance as compared to the interface block 15 which stores all data of the NAND flash memory 18. Thus, the cost of the system 20 according to the invention is advantageously lower than that of the system 10 of FIG. 1.

The memory controller 14 controls and manages memory operations including writing the operating system or data stored in the NAND flash memory 18 to the system memory 19 through the system bus 17, or reading data from the system memory 19. In such operations, the memory controller 14 performs memory mapping between the NAND flash memory 18 and the system memory 19.

Next, the operation of system 20 in FIG. 2 is described. When system 20 is turned on, the boot strapper 25 receives system-initializing signals (e.g., a power-up signal and a system reset signal) in response to system initializing signals, and transfers the boot code stored in the NAND flash memory 18 to the system memory 19. While the boot code is being transferred to the internal RAM 26, the boot strapper 25 generates a control signal for holding the operation of the CPU core 12. After the transfer of the boot code is completed, the control signal is reset and the CPU core 12 is activated and executes "the post-booting operation".

Alternatively, a delay (not shown) within controller 21 may be used to hold operations of the CPU core 12. For example, system-initializing signals (e.g., a power-up signal and a system reset signal) are simultaneously applied to the boot strapper 25 and the delay connected to the CPU core 12. The arrival of the system-initializing signal is delayed until after the boot code is transferred from the NAND flash memory 18 to the internal RAM 26. The delay can be implemented either by delay circuit or software. Thus, the delay is set to delay an amount of time substantially equal to or slightly greater than the time required for such boot code transfer.

Upon activation of the CPU core 12, the boot code stored in the internal RAM 26 is executed. By executing the system initializing code in the boot code, hardwares of the system 20 are initialized. By executing the copy loop instruction code in the boot code, the CPU core 12 reads out other data or programs such as the operating system stored in the NAND flash memory 18. This is preferably performed through the interface 27 and the NAND interface logic 28 of the boot strapper 25 by the unit of a page. Thereafter, the CPU core 12 copies the read-out other data or programs such as the operating system to the system memory 19, through the memory controller 14 and the interface 27. After the copy operation of other data or programs such as the operating system is completed, the operating system is executed. Thus, when the booting process is completed, the system 20 is driven by the operating system from the system memory 19.

According to this embodiment of the present invention, the booting process performed by first copying the boot code stored in the NAND flash memory 18 to the internal RAM 26 and then transferring the operating system to system memory 19 is accomplished with a single stage NAND interface. A faster booting speed is realized when compared to the two-step interface manners (i.e., the NAND interface manner and the NOR interface manner) as seen in the system such as in FIG. 1.

The process of reading out a boot code stored in a NAND flash memory by the boot strapper 25 and transferring the read-out boot code to the internal RAM 26 will be described below more fully with reference to FIG. 2 and FIG. 3. FIG. 3 illustrates a timing diagram when a boot code is read out from a NAND flash memory according to a preferred embodiment of the present invention.

The boot strapper 25 outputs control signals (e.g., CLE, ALE, CE, WE, RE, and R/B) to read out a boot code stored in a NAND flash memory in response to a system-initializing signal. A read command is generated at 00h with addresses ad0, adi, and ad2. The system-initializing signal includes a power-up signal (generated when a system is powered up); a system reset signal, or a re-reset signal.

The command latch enable signal (CLE) is activated when a predetermined command is inputted to the NAND flash memory 18. The address latch enable signal (ALE) is activated when a predetermined address is inputted to the NAND flash memory 18.

The NAND flash memory 18 receives the read command 00h via the system bus 17 in response to an active (e.g., logic 'high') command latch enable signal (CLE), an active (e.g., logic 'low') chip enable signal (CE#), and an active write enable signal (WE#). Here "#" means an active low state.

Also the NAND flash memory 18 receives an address via the system bus 17 in response to an active address latch enable signal (ALE), an active chip enable signal (CE#), and an active write enable signal (WE#). The number of the generated addresses can be set according to a NAND flash memory address step select signal.

According to this embodiment of the invention, a 3-step addressing of the NAND flash memory 18 is shown in FIG. 3, but one skilled in the art can readily appreciate that the addressing process is not limited thereto, and three or higher number of steps addressing may be used by the NAND flash memory address step select signal.

According to the present embodiment, the boot strapper 25 generates the read command 00h to read out the boot code stored in the NAND flash memory 18, and then generates the addresses ad0, ad1, and ad2. The stored boot code is read out by the unit of page in response to the read command 00h and the addresses ad0, ad1, and ad2. The data read is temporarily stored in an internal buffer (not shown) of the NAND flash memory 18.

Upon an active logic ('low') of a ready/busy signal R/B#, the copy operation of the data (e.g., boot code) to the internal buffer is completed. Upon an inactive logic ('high') of the read/busy signal R/B#, the copy operation of the data (boot code; here D0, D1, D2, and D3) is not completed. Upon activation of the read enable signal RE#, the data D0, D1, D2, and D3 stored in the internal buffer is transferred to the system bus 17. Thereafter, the data D0, D1, D2, and D3 on the system bus 17 is transferred to the internal RAM 26.

According to a preferred embodiment of the present invention, the boot strapper 25 causes a hold or delay in the operation of the CPU core 12 in response to the system initializing signal, and concurrently outputs the control signals such as CE#, CLE, ALE, WE#, RE#, and R/B# to the NAND flash memory 18 preferably through the NAND interface logic 28 and the interface 27. Data read from the NAND flash memory 18 is transferred to the boot strapper 25 through the NAND interface logic 28 and the interface 27 in response to control signals such as CE#, CLE, ALE, WE#, RE#, and R/B#. The boot strapper 25 stores the boot code in the internal RAM 26, and then releases the hold on the CPU 12. Alternatively, the CPU core is delayed for a time duration greater than the time required for storing the boot code in the internal RAM 26. The delay can be an adjustable timer. Thus, while the CPU core 12 is held, the boot code stored in the NAND flash memory 18 has transferred to the internal RAM 26.

Thereafter, executing the system initializing code in the boot code loaded in the internal RAM 26 causes the hardwares of the system 20 to be initialized. And by executing a copy loop instruction code in the boot code, the CPU core 12 causes the transfer of the operating system from the NAND flash memory 18 to the system memory 19, preferably through the memory controller 14 and the interface 27. Multiplexing or data selection circuitry (not shown) in interface 27 multiplexes access to the system bus 17, thereby preventing access of the system bus 17 by the memory controller 14 and the boot strapper 25 at the same time.

After the copy of the operating system to the system memory 19 is completed, the operating system is executed from the system memory 19 and the system 20 is driven therefrom.

Figure 4:
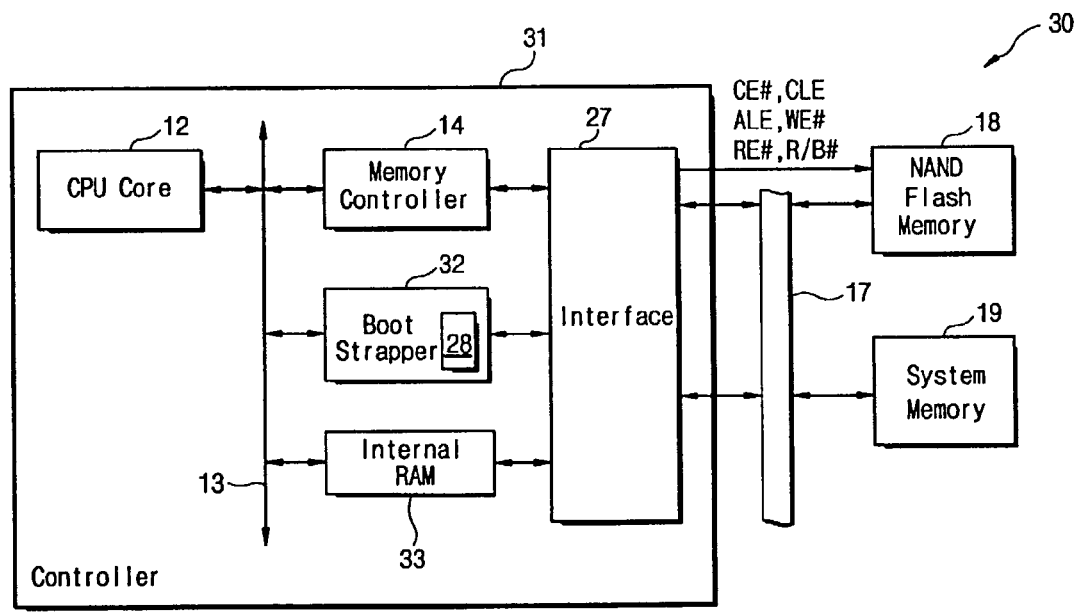
FIG. 4 shows another embodiment of a computing system according to the present invention.

A second embodiment of a boot system using the NAND flash memory according to the invention is illustrated in FIG. 4. According to this embodiment the internal RAM 33 is placed outside of the boot strapper 32. Access to the internal RAM 33 from the boot strapper 32 is preferably via internal system bus 13; otherwise the operations of data transfer from the NAND flash memory 18 are the same as previously described.

Figure 5:
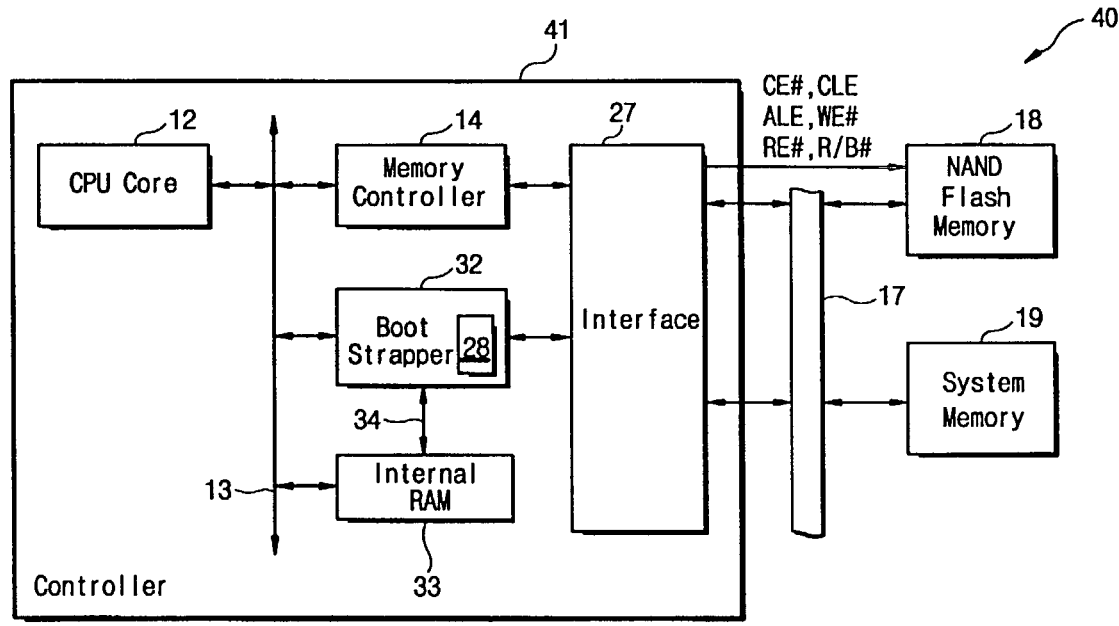
FIG. 5 shows another embodiment of a computing system according to the present invention.

According to a third embodiment of a boot system using the NAND flash memory according to the present invention, which is illustrated in FIG. 5, access to an internal RAM 33 from the boot strapper 32 is preferably through a private bus 34; otherwise, the operations of data transfer from the NAND flash memory 18 are the same as previously described. The use of the private bus 34 for loading to the internal RAM 33 reduces the amount of time needed to transfer the boot code from the NAND flash memory 18, thereby improving system performance.

Figure 6:
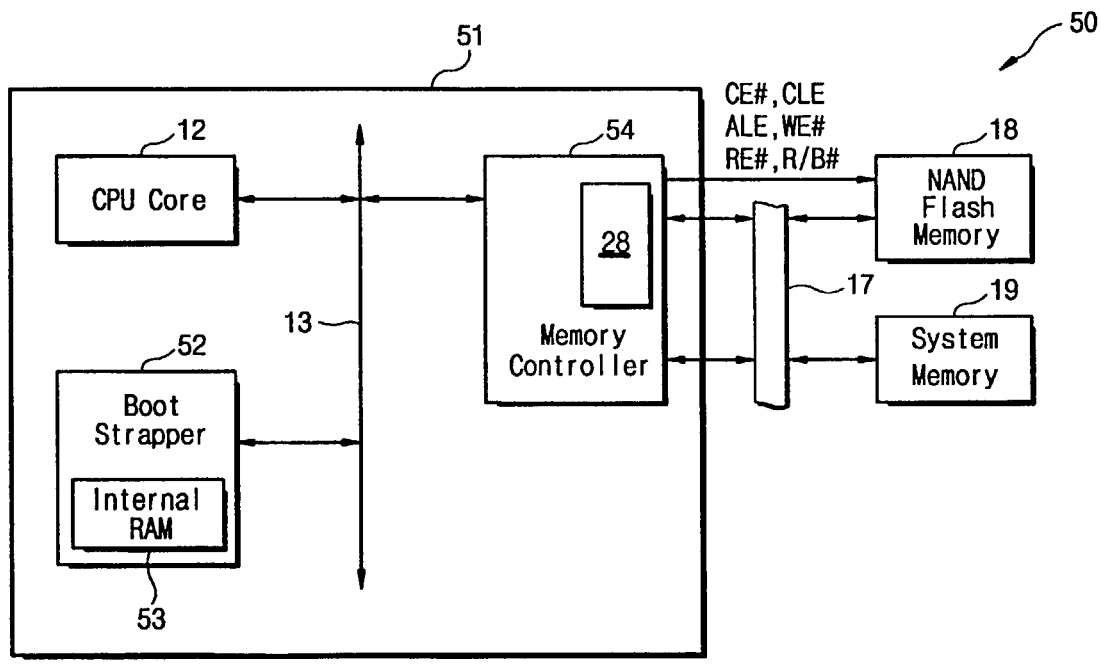
FIG. 6 shows another embodiment of a computing system according to the present invention.

A fourth embodiment of a boot system using the NAND flash memory according to the invention is illustrated in FIG. 6. A system 50 of FIG. 6 includes a controller 51, a NAND flash memory 18, a system bus 17, and a system memory 19.

The controller 51 includes a boot strapper 52, a CPU core 12, an internal system bus 13, and an internal RAM 53 and a memory controller 54 having a NAND interface logic 28. As shown in FIG. 6, the internal RAM 53 is within the boot strapper 52, but the internal RAM 53 can also be placed external to the boot strapper 52, as in FIG. 4 and FIG. 5.

According to this embodiment the memory controller 54 is used to control the system memory 19 and to directly access the NAND flash memory 18. Thus, the memory controller 54 according to this embodiment is capable of performing the functions previously performed by interface 27 which are shown in FIG. 2.

The boot strapper 52 holds an operation of the CPU core 12 in response to a system initializing signal, and concurrently reads out a boot code stored in the NAND flash memory 18 through the internal system bus 13 using a NAND interface manner by the NAND interface logic 28. Afterwards, the boot strapper 52 loads the read-out boot code to the internal RAM 53. The system-initializing signal is a signal generated in response to a power-on signal or a reset signal.

By executing a system initializing code in the boot code, hardwares of the system 20 are initialized. And by executing a copy loop instruction code in the boot code, the CPU core 12 reads out an operating system stored in the NAND flash memory 18 through the memory controller 54, and loads the operating system into the system memory 19. After the copy of the operating system to the system memory 19 is completed, the operating system is executed to from the system memory 19.

Figure 7:
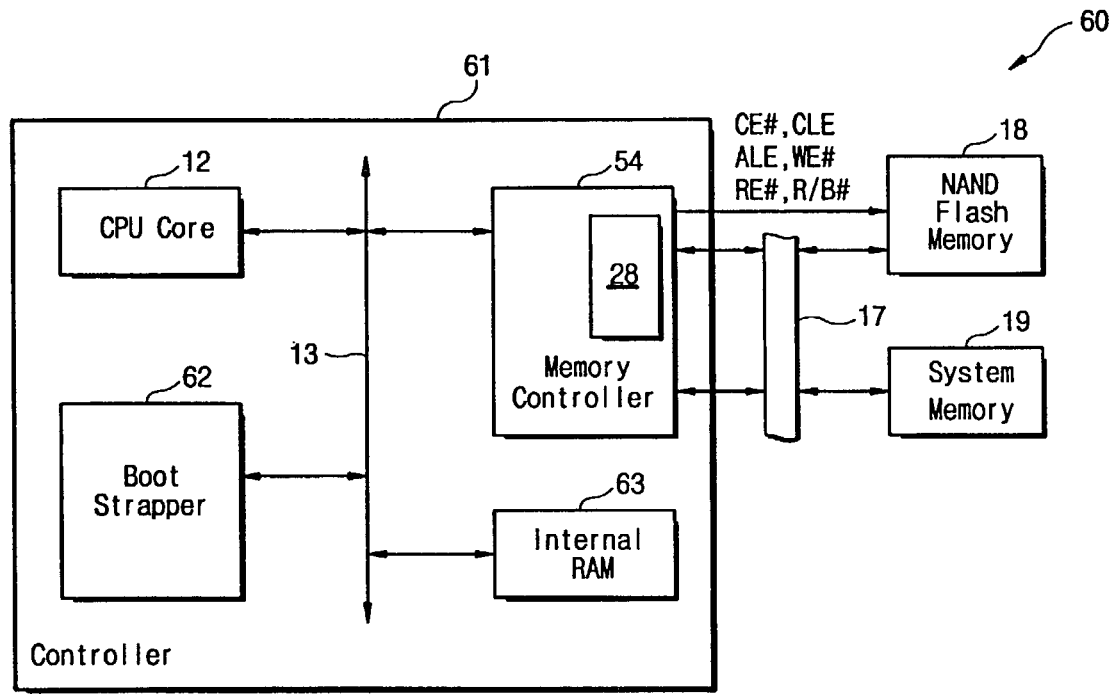
FIG. 7 shows another embodiment of a computing system according to the present invention.

A fifth embodiment of a boot system using the NAND flash memory according to the present invention is illustrated in FIG. 7. A controller 61 includes a CPU core 12, a boot strapper 62, an internal system bus 13, a memory controller 54, and an internal RAM 63. It is noted that the internal RAM 63 is placed outside of the boot strapper 62.

The boot strapper 62 holds an operation of the CPU core 12 in response to a system initializing signal, and concurrently reads out a boot code stored in the NAND flash memory 18 using a NAND interface manner by a NAND interface logic 28 of the memory controller 54. Afterwards, the boot strapper 62 loads the read-out boot code to the internal RAM 63 through the internal system bus 13.

Figure 8:
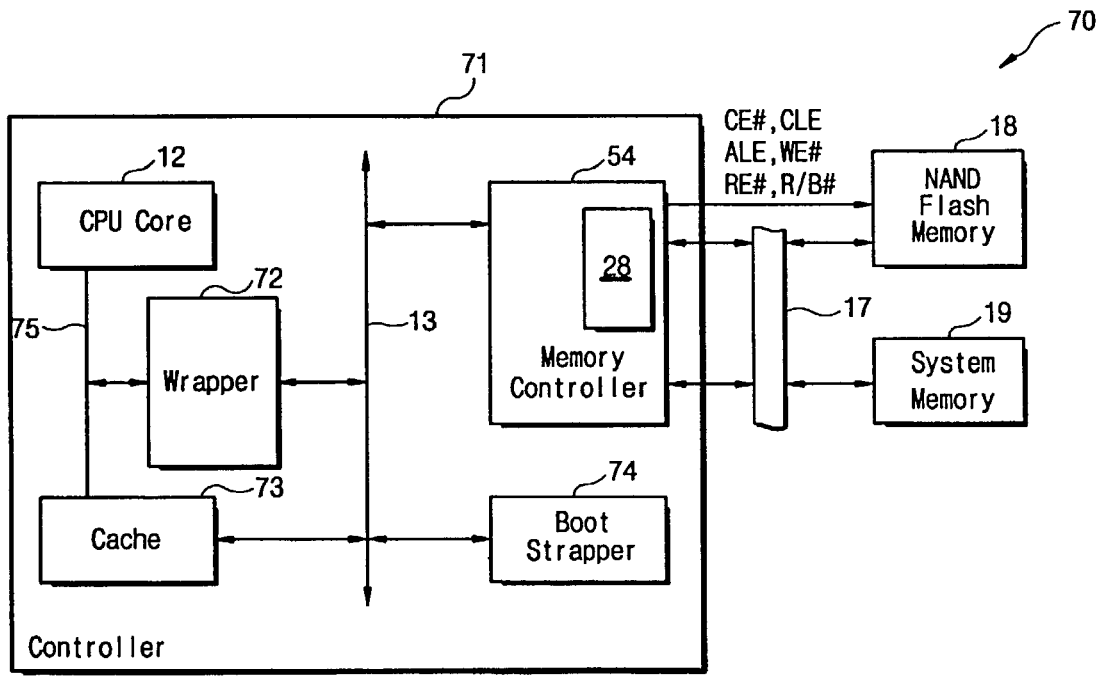
FIG. 8 shows another embodiment of a computing system according to the present invention.

A sixth embodiment of a boot system using a NAND flash memory according to the invention is illustrated in FIG. 8. A controller 71 includes a CPU core 12, a local bus 75, a cache memory 73, a wrapper 72, an internal system bus 13, a memory controller 54, and a boot strapper 74. The wrapper 72 interfaces the local bus 75 and the internal system bus 13. The wrapper is preferably a software program or hardware which is executed to selectively control access to or from the cache memory 73. The cache memory 73 is positioned adjacent to the CPU core 12 for temporarily storing frequently used data. The access time of the cache memory 73 is shorter than that of the internal RAM of FIG. 7.

In the case where the cache memory 73 is accessed through the internal system bus 13, the boot strapper 74 delays or holds an operation of the CPU core 12 in response to a system initializing signal, and concurrently reads out a boot code stored in the NAND flash memory 18 using a NAND interface manner by the NAND interface logic 28. Afterwards, the boot strapper 74 writes the read-out boot code in the cache memory 73 through the internal system bus 13.

In the case where the cache memory 73 is accessed through the local bus 75, the boot strapper 74 holds the operation of the CPU core 12 in response to the system initializing signal, and concurrently reads out the boot code stored in the NAND flash memory 18 using the NAND interface logic 28. Afterwards, the boot strapper 74 writes the read-out boot code in the cache memory 73 through the wrapper 72 and the local bus 75. The system booting process employing the boot system according to the present embodiment is quicker because of the shorter access time of the cache memory 73.

Figure 9:
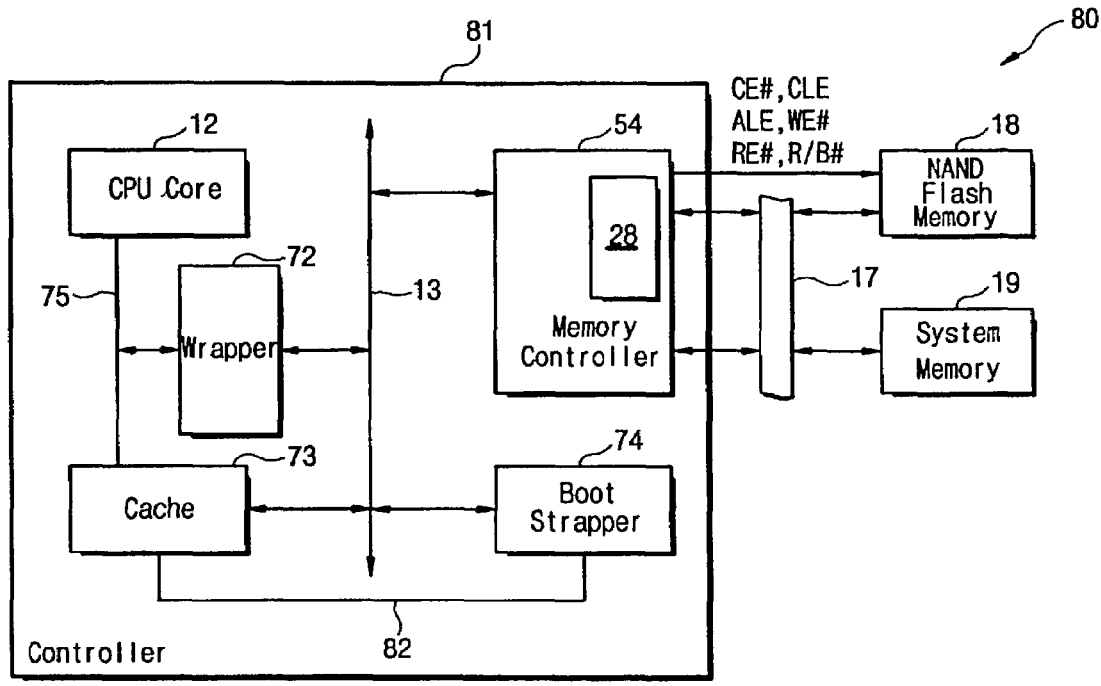
FIG. 9 shows another embodiment of a computing system according to the present invention.

A seventh embodiment of a boot system using the NAND flash memory according to the invention is illustrated in FIG. 9. A controller 81 includes a second local bus 82 for transferring data between a cache memory 73 and a boot strapper 74. A boot strapper 74 of FIG. 9 operates the same way as to the boot strapper of FIG. 8.

The boot strapper 74 holds an operation of the CPU core 12 in response to a system initializing signal, and concurrently reads out a boot code stored in a NAND flash memory device 18 using the NAND interface logic 28 of the memory controller 54. Afterwards, the boot strapper 74 writes (copies, loads, and transfers) the read-out boot code in the cache memory 73 through the private bus 82. Subsequent operations, after storing the boot code in the cache memory 73, are the same as described for FIG. 6 except that the private bus 82 is used.

Figure 10:
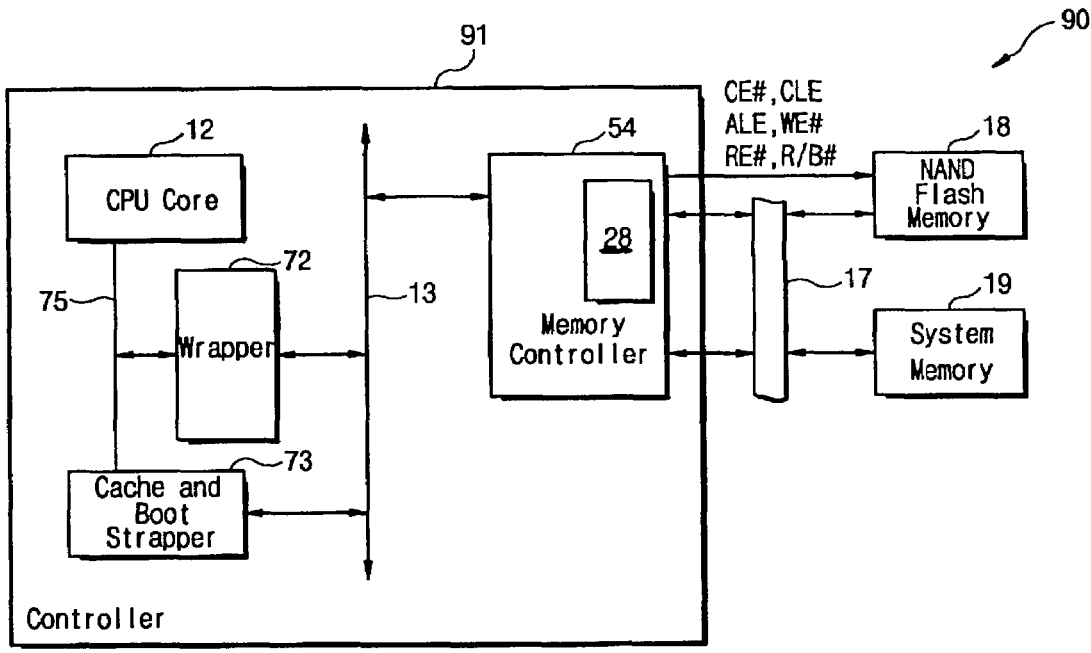
FIG. 10 shows another embodiment of a computing system according to the present invention.

An eighth embodiment of a boot system using the NAND flash memory according to the invention is illustrated in FIG. 10. A controller 91 includes a CPU core 12, a local bus 75, a wrapper 72, a cache and boot strapper 92, an internal system bus 13, and a memory controller 54. The cache and boot strapper 92 is a boot strapper having a cache memory integrated therein.

The cache and boot strapper 92 holds an operation of the CPU core 12 in response to a system-initializing signal, and concurrently reads out a boot code stored in the NAND flash memory 18. Afterwards, the cache and boot strapper 92 loads the read-out boot code to the cache memory therein through the internal system bus 13. Alternatively, the wrapper 72 can be set to lead the boot code through the local bus 75.

Figure 11:
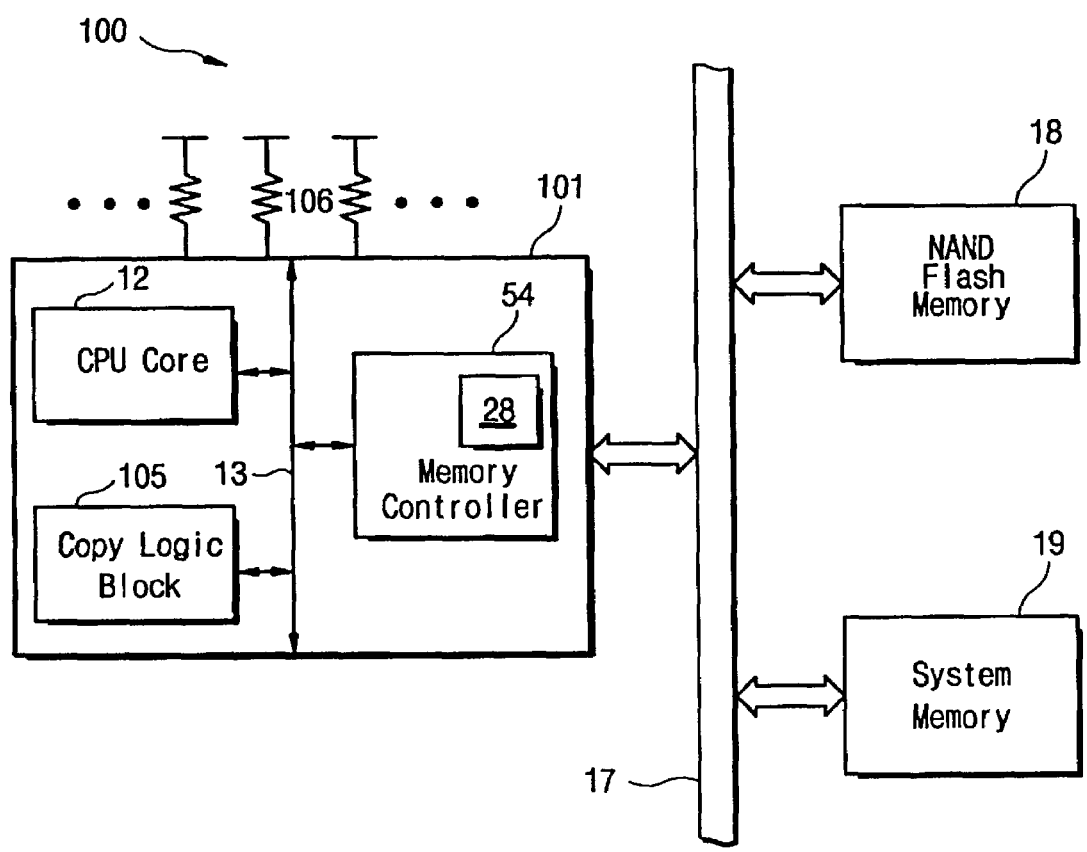
FIG. 11 shows another embodiment of a computing system according to the present invention.

A ninth embodiment of a boot system using the NAND flash memory according to the invention is illustrated in FIG. 11. A controller 101 includes a CPU core 12, a memory controller 54, a copy logic block 105, an internal system bus 13, and option pins 106. The option pins are selectively coupled to a power supply voltage VCC or a ground voltage GND. According to the present embodiment, the controller 101 performs an initializing operation where a system memory is initialized by setting a mode register (MRS) (not shown) in the system memory 19. The MRS can be set by using the option pins 106. The MRS is preset to an operation mode of the system memory 19 to be used, e.g., a CAS latency or a burst length. For example, a size of data loaded to the system memory 19 in the NAND flash memory at one time is determined according to the burst length. The copy logic block 105 instructs an operation for copying data such as [boot code,] operating system, or general data stored in the NAND flash memory 18 to the system memory 19, and includes a sequence of instructions for the controller 101. According to this embodiment, the boot code is not necessary and need not be stored in the NAND flash memory 18. An operation of the CPU core 12 is held in response to a system-initializing signal. Concurrently, the copy logic block 105 is set to store the data such as the operating system and the general data read from the NAND flash memory 18 into the system memory 19. After the copy is completed, the CPU core 12 is activated and the operating system is executed in the system memory 19. The system 20 is then driven in response to the operating system.

In such an apparatus 100, a system initializing operation for initializing the system memory 19 is completed according to coupling information of the option pins 106. Since the process of copying a boot code to the controller is eliminated, system-booting speed is improved.

Figure 12:
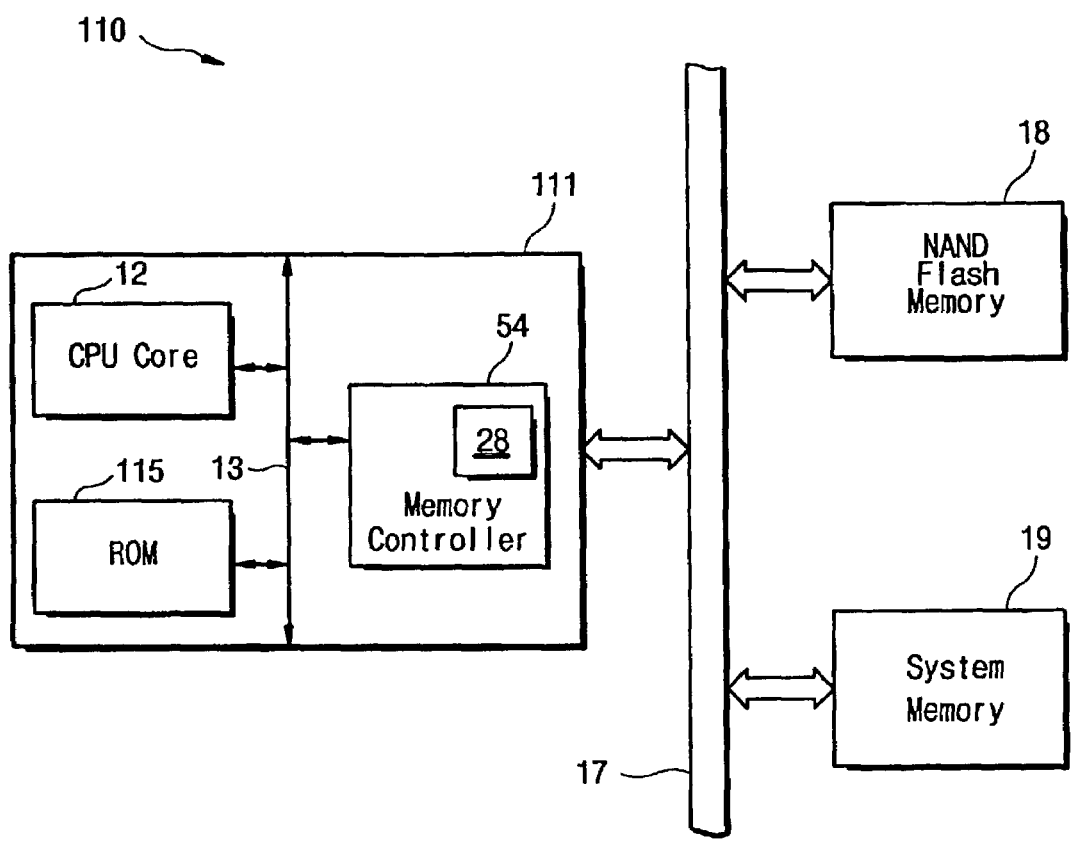
FIG. 12 shows another embodiment of a computing system according to the present invention.

A tenth embodiment of a boot system using the NAND flash memory according to the invention is illustrated in FIG. 12. A controller 111 includes a CPU core 12, a memory controller 54, an internal system bus 13, and a ROM block 115. Here, the ROM block 115 replaces the copy logic block 105 of FIG. 11. ROM data including a system initializing code and code for instructing data stored in the NAND flash memory 18 to be copied to the system memory 19 is prestored in to the ROM block 115. The ROM block 115 preferably comprises a mask ROM, a flash memory or the like.

In response to a system initializing signal, the CPU core 12 is activated to carry out an initializing operation according to the system initializing code incorporated in the ROM block 115 and to copy an operating system or general data stored in the NAND flash memory 18 to the system memory 19. After the copy operation is completed, the CPU core 12 is activated and the operating system in the system memory 19 is executed. That is, when the booting is finished, a system 110 is driven in response to the operating system.

Figure 13:
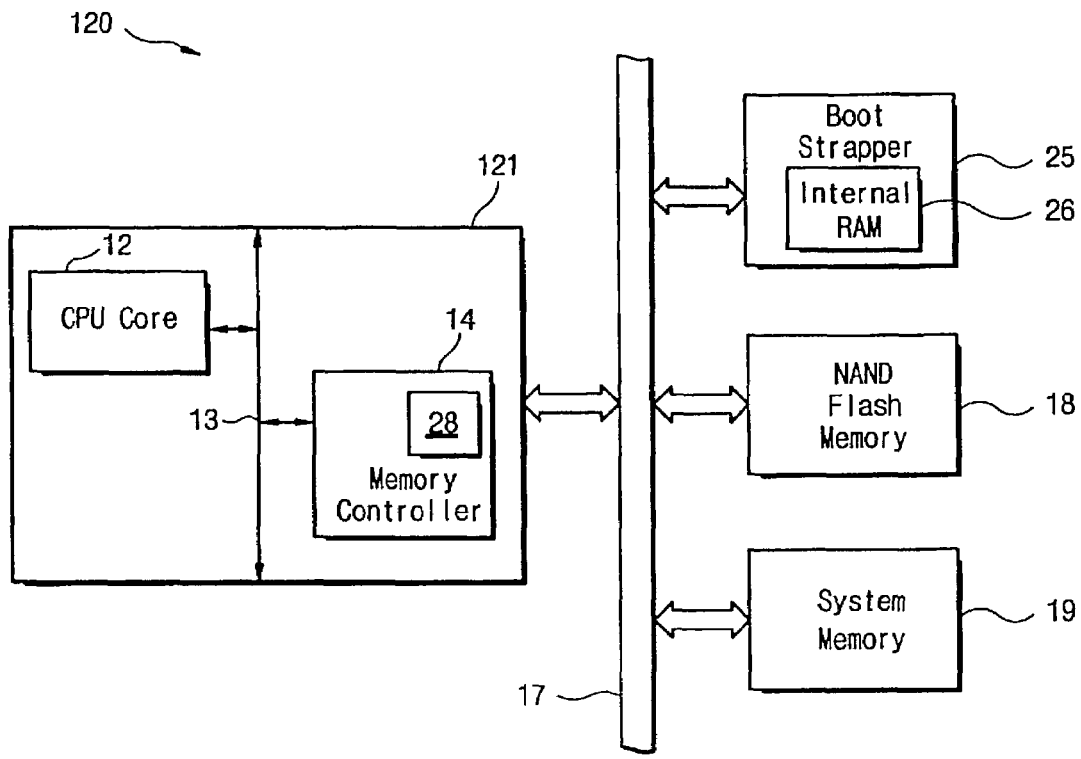
FIG. 13 shows another embodiment of a computing system according to the present invention.

An eleventh embodiment of a boot system using the NAND flash memory according to the invention is illustrated in FIG. 13. A system 120 includes a controller 121, a boot strapper 25, a NAND flash memory 18, and a system memory 19. The controller 121 has a CPU core 12, an internal system bus 13, and a memory controller 14. According to the present embodiment, the boot strapper 25 is placed outside of the controller 121 and is operatively connected to the controller 121 via system bus 17.

In response to a system-initializing signal, an operation of the CPU core 12 is held, and the boot strapper 25 concurrently loads a boot code stored in the NAND flash memory 18 to the internal RAM 26 through a system bus 17. Subsequent operations, after storing the boot code in the internal RAM 26, are the same as described for FIG. 2.

Figure 14:
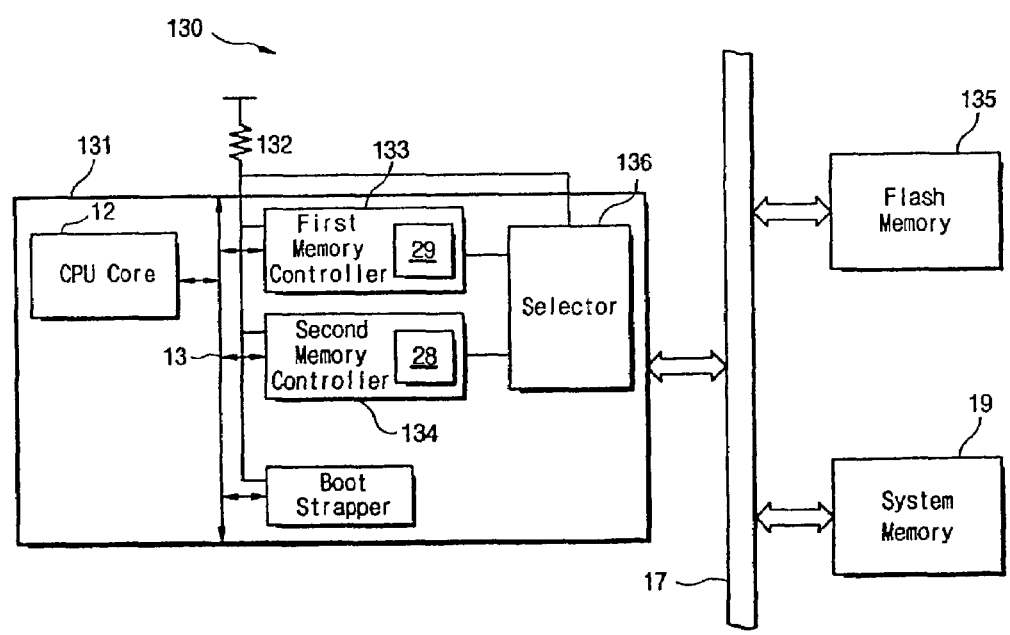
FIG. 14 shows another embodiment of a computing system according to the present invention.

A twelfth embodiment of a boot system using a flash memory according to the invention is illustrated in FIG. 14. A system 130 includes a controller 131, a flash memory 135, a system memory 19, and a system bus 17. The controller 131 has a CPU core 12, a first memory controller 133 with a NOR interface logic 29, a second memory controller 134 with a NAND interface logic 28, a selection circuit 136, and an option pin 132. The first and second memory controllers 133 and 134 are selectively connected to the system bus 17 by the selection circuit 136 depending on a type of the flash memory 135. The option pin 132 is coupled to a power supply voltage VCC or a ground voltage GND. The first memory controller 133 or the second memory controller 134 is selectively activated depending on the coupling information of the option pin 132 to the VCC or GND.

According to the present embodiment, the flash memory 135 can be either a NOR flash memory, a NAND flash memory, or other memory type. If a NOR flash memory is employed as the flash memory 135, the first memory controller 133 is connected to the NOR flash memory through the NOR interface logic 29 and the system bus 17. In this case, the first memory controller 133 interconnects the system bus 17 with the NOR flash memory using a conventional NOR interface manner within the first memory controller 133. Thus, the controller 131 of the system 130 can easily access data (e.g., a boot code, an operating system, and general data) of the NOR flash memory. If a NAND flash memory is employed as the flash memory 135, the second memory controller 134 is connected to the NAND flash memory through the NAND interface logic 28 and the system bus 17. In this case, the second memory controller 134 interconnects the system bus 17 with the NAND flash memory, based on the process as described for FIG. 2 through FIG. 13, using a NAND interface manner. As a result, the controller 131 of the system 130 can access data (e.g., a boot code, an operating system, and general data) irrespective of a kind of the flash memory 135.

Figure 15:
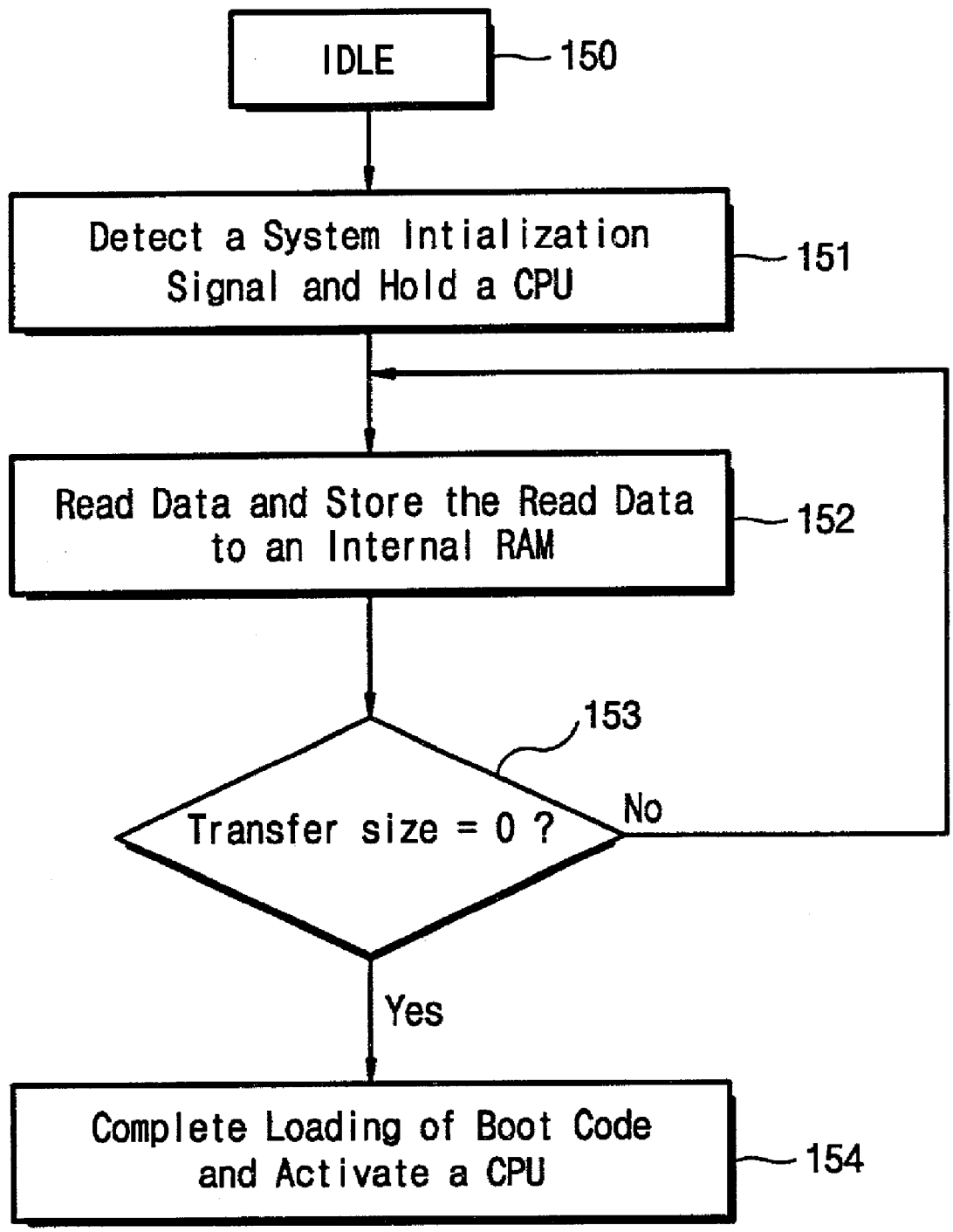
FIG. 15 shows a flow chart illustrating the steps of transferring boot code from the flash memory according to an embodiment of the present invention.

A flowchart showing the steps of loading a boot code stored in the flash memory according to the invention is illustrated in FIG. 15. Referring to FIG. 2 through FIG. 13, an initial state of a boot strapper shown in each of the figures is an idle state (step 150).

In response to a system-initializing signal, the boot strapper detects a page size, density, and data width of a flash memory, and simultaneously outputs a control signal for holding a CPU of a system. Alternatively, the system uses a delay (earlier described) to hold the CPU until a boot code is loaded to an internal RAM (step 151).

The boot strapper reads out a boot code stored in the flash memory by the unit of page according to the method described for FIG. 3, and loads the read-out boot code to an internal RAM inside or outside a controller through a predetermined bus or interface (step 152).

In step 153, the boot strapper detects a transfer size of the loaded boot code. If the transfer size is not '0', the routine returns to the step 152.

If the transfer size is '0', i.e., the boot code stored in the flash memory is all loaded to the internal RAM, the boot strapper finishes loading the boot code and activates the CPU of the system (step 154).

According to the system booting method, a boot code stored in a flash memory is loaded to an internal RAM inside or outside a controller before the CPU core operates. By the boot code stored in the internal RAM, a predetermined operating system stored in the flash memory is copied to an external system memory 19. After the copy operation is completed, the operating system is executed in a system memory 19.

After all programs, files or data associated with the operating system are loaded to the system memory 19, the system is driven from operating system from system memory 19.

Having thus described the invention with the details and particularity required by the patent laws, it is noted that modifications and variation can be made by persons skilled in the art in light of the above teachings. It is therefore to be understood that changes may be made in the particular embodiments of the invention disclosed which are within the scope and spirit of the invention as defined by the appended claims.

What is claimed is:

1. A system having a CPU core, a system memory, and an interface for communicating data therebetween, the system comprising:
   a NAND flash memory for storing at least a boot code;
   a boot strapper for coordinating transfer of a control signal to the NAND flash memory and receiving the boot code from the NAND flash memory through the interface; and
   a RAM for storing the boot code accessed from the NAND flash memory, wherein booting of the system includes reading of the boot code from the RAM by the CPU core, wherein the boot strapper includes the RAM for storing the boot code.

2. The system of claim 1, wherein the boot code includes a system initialization program and a copy instruction program.

3. The system of claim 1, wherein the boot strapper includes a NAND interface logic for interfacing the NAND flash memory.

4. The system of claim 1 wherein the RAM is coupled to the CPU core and connected to the interface through the boot strapper.

5. The system of claim 1, further including a delay for delaying operations of the CPU core until the boot code is stored in the RAM.

6. The system of claim 5, wherein the delay is implemented by the boot strapper.

7. The system of claim 1, wherein the interface is implemented by a memory controller.

8. The system of claim 7, wherein the memory controller includes a NAND interface logic.

9. The system of claim 1, wherein the RAM is a cache memory connected to the CPU core through a first local bus.

10. The system of claim 9, further including a wrapper for connecting the first local bus and a second local bus.

11. The system of claim 10, wherein the interface is implemented by a memory controller.

12. The system of claim 11, wherein the memory controller includes a NAND interface logic.

13. The system of claim 1, further including a memory controller for controlling the NAND flash memory and the system memory through the interface and a system bus, wherein the interface includes means for preventing access of the system bus by the memory controller and the boot strapper at the same time.

14. The system of claim 13, wherein the memory controller includes a NAND interface logic.

15. A system having a CPU core, a system memory, and an interface for communicating data therebetween, the system comprising:
   a NAND flash memory for storing at least a boot code;
   a boot strapper connected to the NAND flash memory through a system bus for receiving the boot code from the NAND flash memory, the boot strapper including a RAM arranged therein for storing the boot code, wherein booting of the system includes reading of the boot code from the RAM by the CPU core.

16. The system of claim 15, further including a memory controller for controlling the NAND flash memory and the system memory through the interface and a system bus, wherein the interface includes means for preventing access of the system bus by the memory controller and the boot strapper at the same time.

17. The system of claim 15, wherein the memory controller includes a NAND interface logic.

18. A system having a CPU core, a system memory, and an interface for communicating data therebetween, the system comprising:
   a flash memory for storing at least a boot code;
   a boot strapper for coordinating transfer of a control signal to the flash memory and receiving the boot code from the flash memory through the interface and including a RAM for storing the boot code received from the flash memory;
   first and second memory controllers for selectively controlling the flash memory; and
   a selector for selecting operation of one of the first and second memory controllers depending on the type of flash memory.

19. The system of claim 18, wherein the flash memory is one of a NOR and a NAND flash memory.

20. The system of claim 19, wherein the first memory controller includes a NOR interface logic and the second memory controller includes a NAND interface logic.

21. The system of claim 18, wherein the selector includes a select pin for selecting operation of one of the first and second memory controllers.

22. A method of booting a computing device having a CPU core, system memory, and a memory controller, the method comprising the steps of:

prestoring boot code in a NAND flash memory;

receiving a system-initializing signal;

transferring the boot code from the NAND flash memory to a RAM included in a boot strapper;

executing by the CPU core the boot code stored in the RAM included in the boot strapper.

23. The method according to claim 22, further including the step of:

upon receiving the system initializing signal;

holding the CPU core from execution until the completion of the step of transferring the boot code from the NAND flash memory into the RAM.

\* \* \* \* \*